(12) United States Patent
Gilfix et al.

(10) Patent No.: US 7,966,625 B2
(45) Date of Patent: Jun. 21, 2011

(54) EXTENDING WEB SERVICE DESCRIPTION LANGUAGE FOR SIP/CALL FLOW INTERACTIONS

(75) Inventors: Michael A. Gilfix, Austin, TX (US); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 11/553,325

(22) Filed: Oct. 26, 2006

(65) Prior Publication Data

US 2008/0104238 A1    May 1, 2008

(51) Int. Cl.
*G06F 13/00*    (2006.01)
(52) U.S. Cl. ........................ 719/330; 719/331
(58) Field of Classification Search .................. 719/330, 719/331
See application file for complete search history.

(56) References Cited

U.S. PATENT DOCUMENTS

| | | | |
|---|---|---|---|
| 5,767,796 | A | 6/1998 | Van Roekel et al. |
| 6,173,437 | B1 | 1/2001 | Polcyn |
| 6,671,618 | B2 | 12/2003 | Hoisko |
| 6,751,796 | B1 | 6/2004 | Seaman et al. |
| 6,981,263 | B1 | 12/2005 | Zhang et al. |
| 7,343,428 | B2 * | 3/2008 | Fletcher et al. ............... 709/250 |
| 2002/0111737 | A1 | 8/2002 | Hoisko |
| 2003/0030671 | A1 | 2/2003 | Cobb et al. |
| 2003/0083882 | A1 | 5/2003 | Schemers, III et al. |
| 2003/0084127 | A1 | 5/2003 | Budhiraja et al. |
| 2003/0095540 | A1 | 5/2003 | Mulligan et al. |
| 2003/0182624 | A1 | 9/2003 | Large |
| 2004/0006653 | A1 * | 1/2004 | Kamen et al. ................. 709/330 |
| 2004/0088186 | A1 | 5/2004 | Anvekar et al. |
| 2004/0155815 | A1 | 8/2004 | Muncaster et al. |
| 2004/0220810 | A1 | 11/2004 | Leask et al. |
| 2005/0066058 | A1 | 3/2005 | An et al. |

(Continued)

FOREIGN PATENT DOCUMENTS

EP    0 769 678 A1    4/1997

(Continued)

OTHER PUBLICATIONS

Chou et al., "Web Service for Tele-Communication", Proceedings of the Advanced International Conference on Telecommunications and International Conference on Internet and Web Applications and Services (AICT/ICIW 2006), Feb. 19, 2006, 6 pages.

(Continued)

*Primary Examiner* — Andy Ho
(74) *Attorney, Agent, or Firm* — Stephen R. Tkaca; Stephen J. Walder, Jr.; David A. Mirna, Jr.

(57) ABSTRACT

An extended Web services description language (WSDL) is provided to allow for the merging of call flow XML with the interface description. This is accomplished through additional WSDL bindings for operations that associate an operation with segments or message points within the call flow. In addition, the extension to WSDL defines a set of interactions that provide additional semantics for how the operation interacts with the call flow. These interactions capture the interaction points between the WSDL. The WSDL interfaces that are created may be used for outbound interactions (i.e. initiated through Web services from some event within the call flow) or for the usual inbound request response. An additional lifecycle listener interface is used to convey different binding points between an enhanced converged Web service processing engine and a converged application implementation of the WSDL.

20 Claims, 9 Drawing Sheets

U.S. PATENT DOCUMENTS

| | | | |
|---|---|---|---|
| 2005/0086360 A1 | 4/2005 | Mamou et al. | |
| 2005/0105541 A1 | 5/2005 | Jain et al. | |
| 2005/0108388 A1 | 5/2005 | Bou-Ghannam et al. | |
| 2005/0108735 A1 | 5/2005 | Need et al. | |
| 2005/0120353 A1 | 6/2005 | Zhang et al. | |
| 2005/0193124 A1 | 9/2005 | Chou et al. | |
| 2005/0198320 A1 | 9/2005 | Chou et al. | |
| 2005/0223109 A1 | 10/2005 | Mamou et al. | |
| 2005/0243604 A1 | 11/2005 | Harken et al. | |
| 2006/0036687 A1 | 2/2006 | Wood et al. | |
| 2006/0047840 A1 | 3/2006 | Postmus | |
| 2006/0080120 A1 | 4/2006 | Tcherevik | |
| 2006/0080428 A1 | 4/2006 | Trossen et al. | |
| 2006/0080443 A1 | 4/2006 | Kruglick et al. | |
| 2006/0090166 A1 | 4/2006 | Dhara et al. | |
| 2006/0095544 A1 | 5/2006 | Geppert et al. | |
| 2006/0095576 A1 | 5/2006 | Perry et al. | |
| 2006/0101435 A1 | 5/2006 | Akilov et al. | |
| 2006/0104306 A1 | 5/2006 | Adamczyk et al. | |
| 2006/0173892 A1 | 8/2006 | Beck | |
| 2007/0011191 A1 | 1/2007 | Otokawa et al. | |
| 2007/0036127 A1 | 2/2007 | Roosen et al. | |
| 2007/0118844 A1* | 5/2007 | Huang et al. | 719/330 |
| 2007/0199002 A1* | 8/2007 | Marvin et al. | 719/330 |
| 2008/0104237 A1 | 5/2008 | Gilfix et al. | |
| 2008/0104569 A1 | 5/2008 | Gilfix et al. | |
| 2008/0127124 A1 | 5/2008 | Gilfix et al. | |

FOREIGN PATENT DOCUMENTS

| | | |
|---|---|---|
| EP | 1 220 179 A | 7/2002 |
| WO | WO 02/093947 A | 11/2002 |

OTHER PUBLICATIONS

Liu et al., "WSIP—Web Service SIP Endpoint for Converged Multimedia/Multimodal Communication over IP", Proceedings of the IEEE International Conference on Web Services (ICWS'04). Jul. 6, 2004, 8 pages.

Cai et al., "Session Initiation Protocol and Web Services for Next Generation Multimedia Applications", Proceedings of the IEEE Fourth International Symposium on Multimedia Software Engineering (MSE'02), Dec. 11-13, 2002, 11 pages.

Geer, David, "Building Converged Networks with IMS Technology", IEEE Computer Society, Nov. 2005, pp. 14-16.

Park et al., "Presence-based Call Reservation Service using Open API on the Web-service architecture in Broadband Converged Network", ICACT, Feb. 20-22, 2006, pp. 270-273.

Peterson, David, "Power to the BPEL: A Technology for Web Services", Business Communications Review, v. 33, n. 6, Jun. 1, 2003, pp. 54-58.

Catchpole, Lawrence, "The Business Process Tier: An IT Imperative for the Process-Driven Enterprise", M1 Global Solutions, Inc., 7 pages.

Benatallah et al., "Web Service Conversation Modeling: A Cornerstone for E-Business Automation", IEEE Computer Society, Jan.-Feb. 2004, pp. 46-54.

Yang et al, "A Rule Based Approach to the Service Composition Life-Cycle", Proceedings of the Fourth International Conference on Web Information Systems Engineering (WISE'03), IEEE Computer Society, 2003, 4 pages.

Thomas et al., "Modeling of Web Services Flow", Proceedings of the IEEE International Conference on E-Commerce (CEC'03), IEEE Computer Society, 2003, 8 pages.

Karastoyanova et al., "Development Life Cycle of Web Service-based Business Processes. Enabling Dynamic Invocation of Web Services at Run Time", Proceedings of The 2nd International Workshop on Web . . . , 14 pages.

Chraibi et al., "Software Development and Integration Using Web Services", pp. 416-422.

Peltz et al., "leveraging open source for web services development", Hewlett-Packard Company, Jul. 2003, pp. 1-21.

Harrison, Andrew, "Dynamic Web Service Deployment Using WSPeer", 30 pages.

Examiner's Answer mailed Jul. 7, 2010 for U.S. Appl. No. 11/553,287; 48 pages.

USPTO U.S. Appl. No. 11/553,287; Image File Wrapper printed Aug. 18, 2010, 2 pages.

USPTO U.S. Appl. No. 11/553,308; Image File Wrapper printed Aug. 18, 2010, 2 pages.

USPTO U.S. Appl. No. 11/553,316; Image File Wrapper printed Aug. 18, 2010, 2 pages.

Reply Brief filed in U.S. Appl. No. 11/553,287, Sep. 7, 2010, 12 pages.

Office Action mailed Jan. 31, 2011 for U.S. Appl. No. 11/553,308, 22 pages.

Office Action mailed Mar. 24, 2011 for U.S. Appl. No. 11/553,316, 25 pages.

Liu, Lei, et al., "Interface Semantic Extension for Web Component Service Matching and Composition", IEEE 2008, 4 pages.

\* cited by examiner

FIG. 3

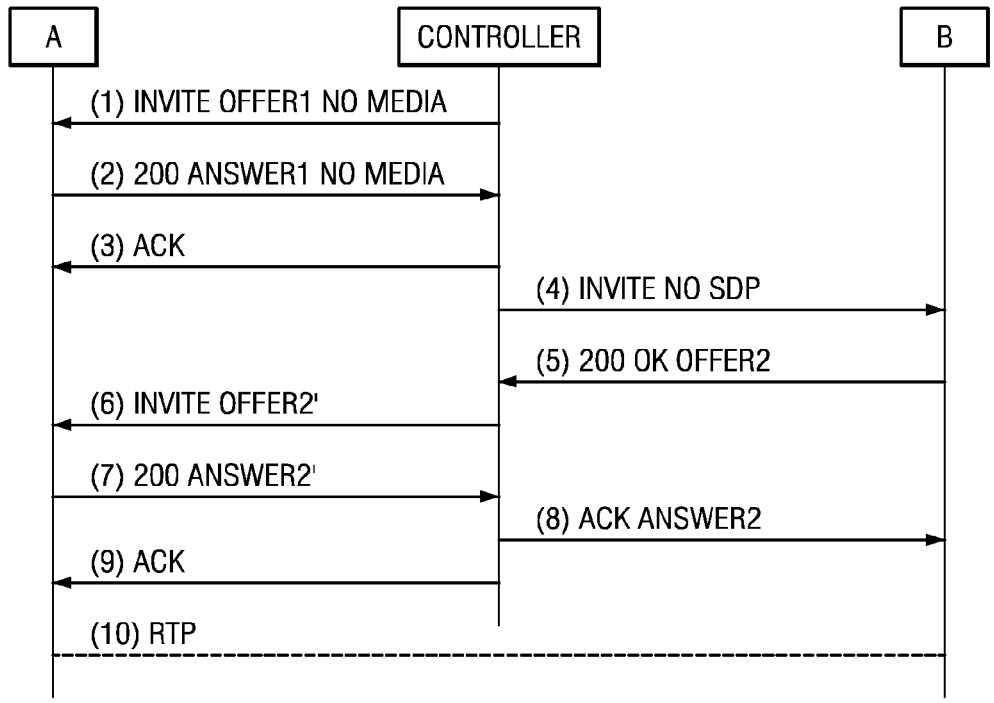

FIG. 4A

```
<wsdl:binding name="MyInterfaceBinding" type="interface:MyInterface">
   <soap:binding style="document" transport="http://schemas.xmlsoap.org/soap/http"/>

<wsdl:operation name="myOperation">
      <soap:operation soapAction=" " style="document"/>
      <wsdl:input>
         <soap:body use="literal"/>
      </wsdl:input>
      <wsdl:output>
         <soap:body use="literal"/>
      </wsdl:output>
      <wsdl:fault name="MyFault">
         <soap:fault name="MyFault" use="literal"/>
      </wsdl:fault>
   </wsdl:operation>
</wsdl:binding>
```

FIG. 4B

```
<wsdl:binding name="MyInterfaceBinding" type="interface:MyInterface">
    <soap:binding style="document" transport="http://schemas.xmlsoap.org/soap/http"/>
    <!-- Additional binding could potentially go here -->>

<wsdl:operation name="myOperation">
        <soap:operation soapAction=" " style="document"/>
        <callflow:binding interaction="notify" segment="2" message="6"/>    ~412
        <wsdl:input>
            <!-- Additional binding could potentially go here -->
            <soap:body use="literal"/>
        </wsdl:input>
        <wsdl:output>
            <soap:body use="literal"/>
        </wsdl:output>
        <wsdl:fault name="MyFault">
            <soap:fault name="MyFault" use="literal"/>
        </wsdl:fault>
    </wsdl:operation>
</wsdl:binding>
```

FIG. 4C

```
<callflow:binding interaction="notify" segment="2" message="6" state="seg:{1,2}"/>
<callflow:binding interaction="notify" segment="2" message="6" state="seg:{1}/>
```

FIG. 5

```
public interface CallFlowWSDLBindingInteractionListener {
    public void onQuery(CallFlowWSDLBindingContext context);
    public void onNotify(CallFlowWSDLBindingContext context);
    public void onDirect(CallFlowWSDLBindingContext context);
    public void onPrescribe(CallFlowWSDLBindingContext context);
    public void onAct(CallFlowWSDLBindingContext context);
};

//contains the information in the binding point
public interface CallFlowWSDLBindingContext{
    public String getSegment();
    public String getMessageID();
    public String getInteractionType();
    public String getState();
};
```

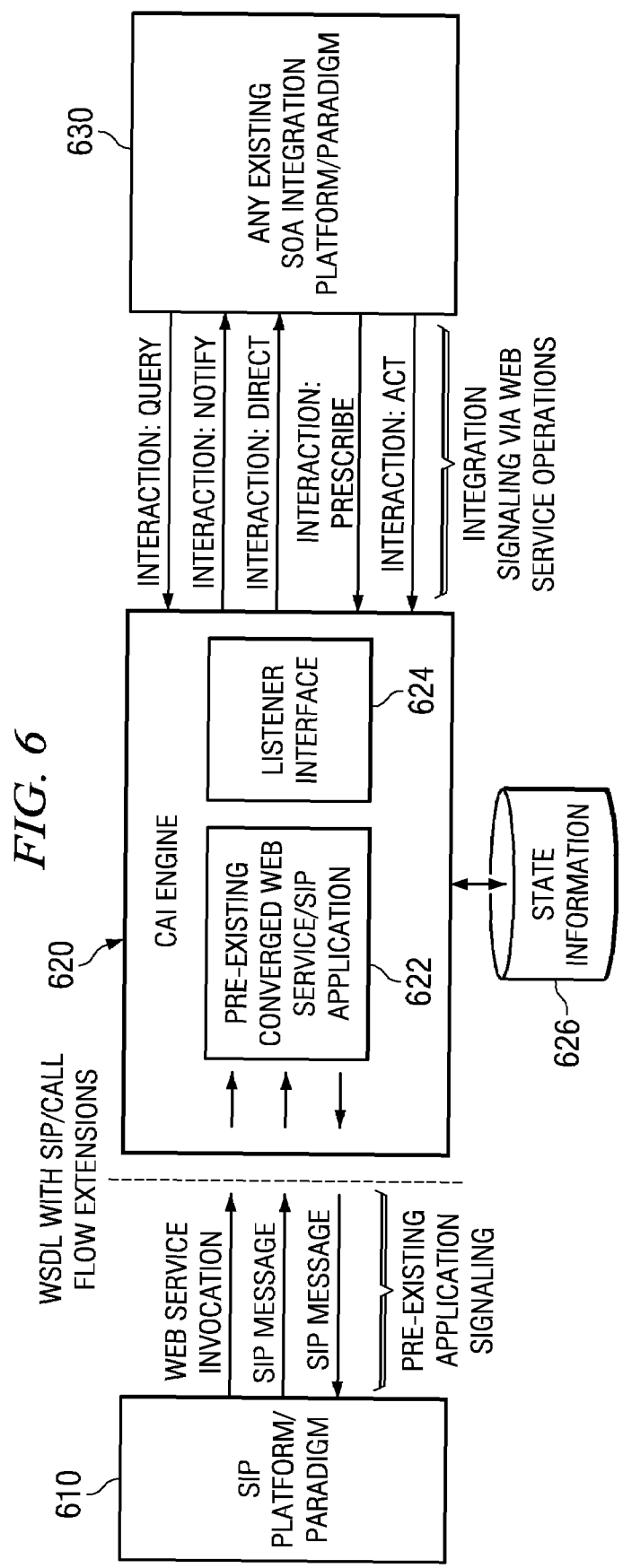

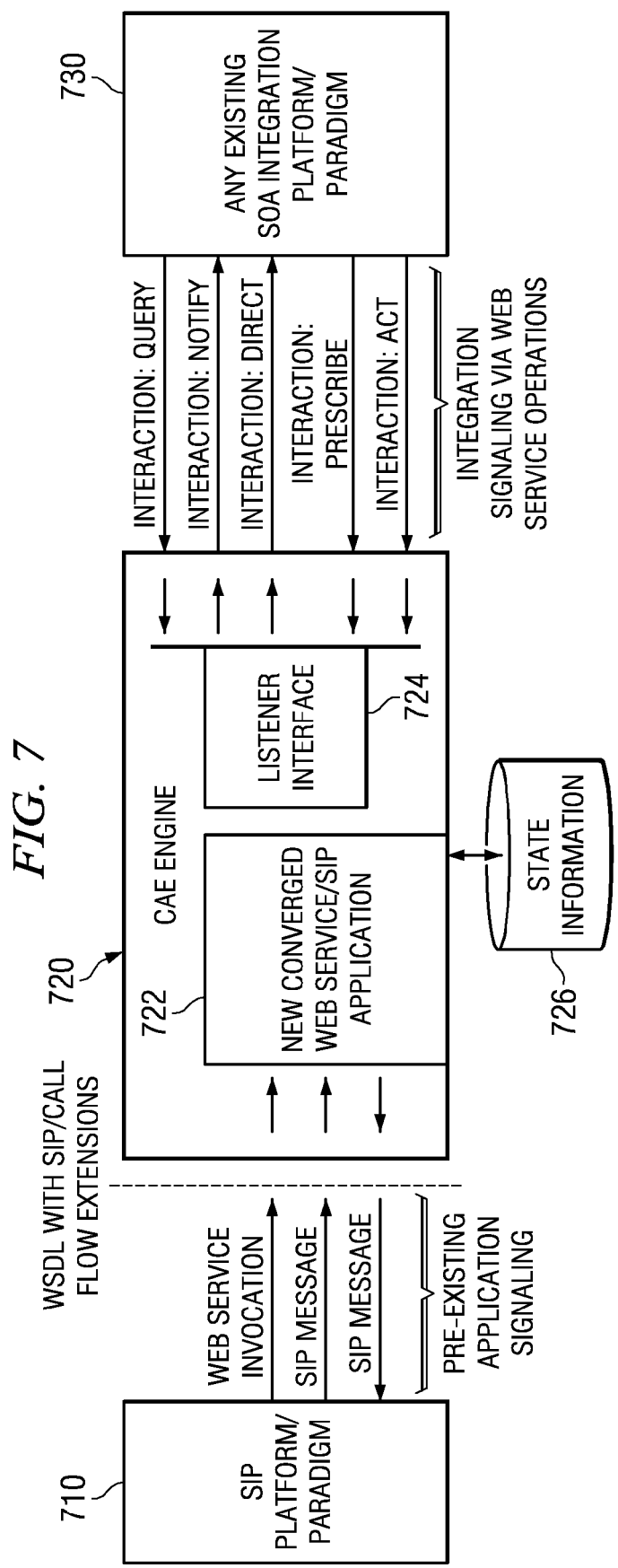

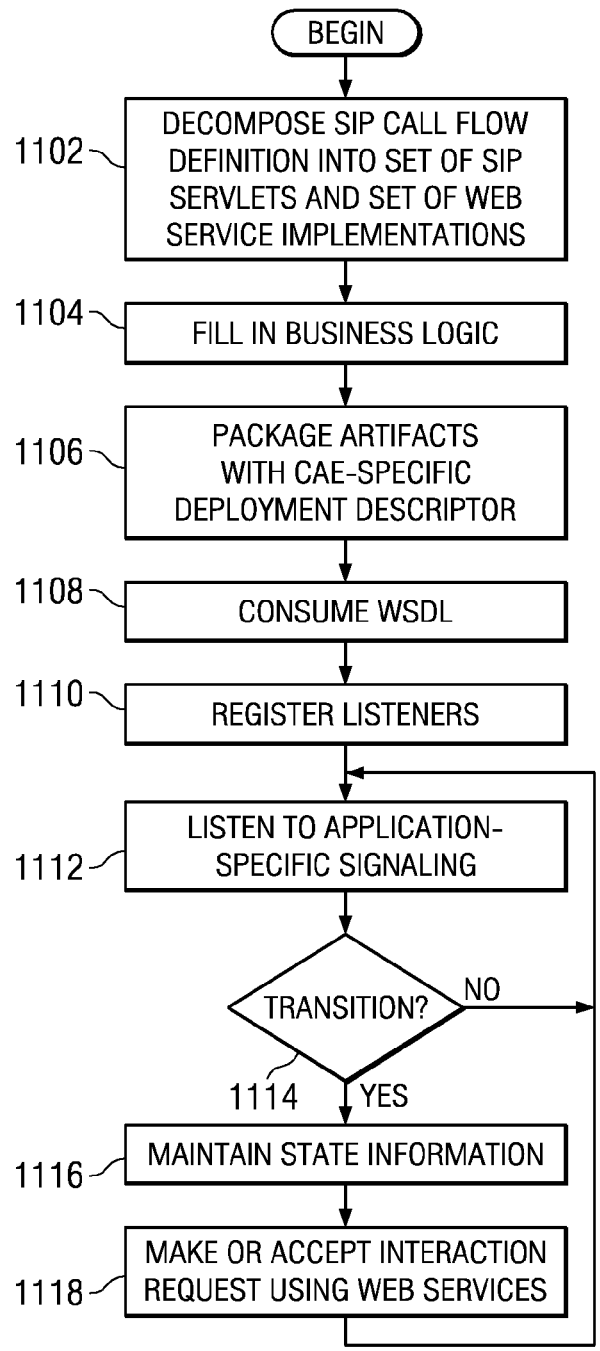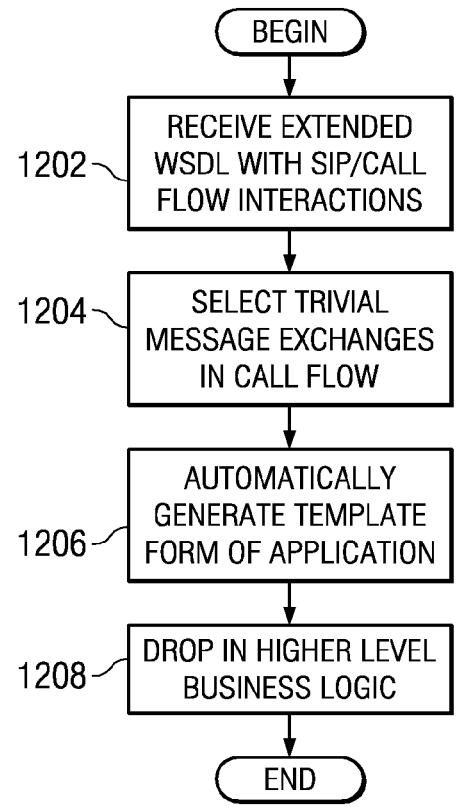

EXTENDING WEB SERVICE DESCRIPTION LANGUAGE FOR SIP/CALL FLOW INTERACTIONS

BACKGROUND

1. Technical Field

The present application relates generally to an improved data processing system and method. More specifically, the present application is directed to extending Web service description language for session initiation protocol call flow interactions.

2. Description of Related Art

Session initiation protocol (SIP) is a signaling protocol used to setup multi-media sessions. SIP is a core protocol in the Internet protocol (IP) multimedia subsystem (IMS) architecture. The SIP programming model for the Java™ 2 Platform, Enterprise Edition (J2EE) application server environment consists of a SIP servlet container. Applications are structured as servlet logic, and lower-level communication is handled by the container.

The SIP programming model lends itself to associating servlets with segments of a call flow. A complex application will typically have multiple servlets as part of its implementation, where an individual servlet will handle different aspects of the flow. Hand-off between servlets is accomplished by setting another servlet as a message handler at a particular point in the call flow.

There have been many efforts to describe SIP call flows in extensible markup language (XML) format. SIP call flows are commonly expressed visually. A call flow describes the order of SIP requests and HTTP requests. This order is idealistic; out-of-order delivery may affect the exchange in reality. However, protocols typically define certain precedence rules that can be used to reason about the protocol. A call flow may be divided into segments, each representing a snippet of call flow logic.

The hypertext transfer protocol (HTTP) is one of the base transport protocols of the World Wide Web. A typical programming model for handling Web requests is via the HTTP servlet programming model. The service-oriented architecture (SOA) is a standardized interface between software so that one program can utilize the functions (services) of another program. SOA typically refers to Web services. Simple object access protocol (SOAP) is a message-based protocol based on XML for accessing services on the Web. SOAP employs XML syntax to send text commands across the Internet using HTTP.

A converged application is an application that communicates over different protocols to accomplish a singular purpose. Each protocol interaction typically contains its own session. The converged application bridges two or more sessions. One way to implement converged applications is through session affinity, where related SIP and HTTP sessions are associated and live in a particular cluster member, and all requests that belong to either type of session are routed to that particular cluster member.

SUMMARY

The illustrative embodiments recognize the disadvantages of the prior art and provide extended Web services description language (WSDL) to allow for the merging of call flow XML with the interface description. This is accomplished through additional WSDL bindings for operations that associate an operation with segments or message points within the call flow. In addition, the extension to WSDL defines a set of interactions that provide additional semantics for how the operation interacts with the call flow. These interactions capture the interaction points between the WSDL. This allows for the same flexibility in interface design, including coarser granularity for business logic, while allowing for fine grained control of the call flow interaction points.

The proposed methodology in the illustrative embodiments is bi-directional. The WSDL interfaces that are created may be used for outbound interactions (i.e. initiated through Web services from some event within the call flow) or for the usual inbound request response. The illustrative embodiments may work with existing WSDL tooling and even allow for interface/call flow design independent of implementation.

An additional lifecycle listener interface is used to convey different binding points between an enhanced converged Web service processing engine and a converged application implementation of the WSDL. The lifecycle events correspond to the binding interaction types and include a reference to the location in the call flow that triggered the lifecycle. A listener may be registered for the application in order to receive lifecycle events for the converged service implementation. This listener may be registered programmatically or within a deployment descriptor.

In one illustrative embodiment, a method in a data processing system for extending Web services to include call flow interactions comprises receiving a description language document that describes one or more Web services interface components, associating a Web services interface component within the one or more Web services interface components with one or more call flow segments, and inserting a call flow binding into the description language document to form an extended description language document. The call flow binding associates an interaction operation with a binding point in a given call flow segment within the one or more call flow segments. The method further comprises executing a converged application based on the extended description language document.

In one exemplary embodiment, the call flow binding is a simple object access protocol binding.

In another exemplary embodiment, the interaction operation is a query operation. The method further comprises querying the given call flow segment for state information responsive to receiving an invocation from a service oriented architecture integration platform.

In a further exemplary embodiment, the interaction operation is a notify operation. The method further comprises sending a notification to the Web services interface component responsive to reaching the binding point in the given call flow segment.

In a still further exemplary embodiment, the interaction operation is a direct operation. The method further comprises pausing execution of the call flow segment responsive to reaching the binding point in the given call flow segment. The method further comprises calling out to an external Web service endpoint to receive direction using bound operation.

In yet another exemplary embodiment, the interaction operation is a prescribe operation. The method further comprises receiving a set of descriptive rules for decision making within the call flow segment responsive to receiving an invocation from a service oriented architecture integration platform.

In another exemplary embodiment, the interaction operation is an act operation. The method further comprises initiating execution of the given call flow segment responsive to receiving an invocation from a service oriented architecture integration platform.

In a further exemplary embodiment, the method further comprises providing a listener corresponding to the binding and, responsive to execution of the converged application matching the binding, invoking the listener.

In another illustrative embodiment, a computer program product is provided comprising a computer useable medium having a computer readable program. The computer readable program, when executed on a computing device, causes the computing device to receive a description language document that describes one or more Web services interface components, associate a Web services interface component within the one or more Web services interface components with one or more call flow segments, and insert a call flow binding into the description language document to form an extended description language document. The call flow binding associates an interaction operation with a binding point in a given call flow segment within the one or more call flow segments. The computer readable program further causes the computing device to execute a converged application based on the extended description language document.

In other exemplary embodiments, the computer readable program, when executed on a computing device, causes the computing device to perform various ones, and combinations of, the operations outlined above with regard to the method illustrative embodiment.

In a further illustrative embodiment, a data processing system for extending Web services to include call flow interactions comprises a processor and a memory coupled to the processor. The memory contains instructions which, when executed by the processor, cause the processor to receive a description language document that describes one or more Web services interface components, associate a Web services interface component within the one or more Web services interface components with one or more call flow segments, and insert a call flow binding into the description language document to form an extended description language document. The call flow binding associates an interaction operation with a binding point in a given call flow segment within the one or more call flow segments. The instructions further cause the processor to execute a converged application based on the extended description language document.

In other exemplary embodiments, the instructions cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 illustrates an example session initiation protocol application call flow in accordance with an exemplary embodiment;

FIG. 4A depicts a Web services description language interface binding in accordance with an illustrative embodiment;

FIG. 4B depicts a Web services description language interface binding with call flow bindings in accordance with an illustrative embodiment;

FIG. 4C illustrates call flow bindings using a state attribute in accordance with an exemplary embodiment;

FIG. 5 illustrates a listening interface in accordance with an illustrative embodiment;

FIG. 6 is a block diagram illustrating a converged application integration engine in accordance with an illustrative embodiment;

FIG. 7 is a block diagram illustrating a converged application execution engine in accordance with an illustrative embodiment;

FIG. 11 is a flowchart illustrating operation of a new converged application in accordance with an illustrative embodiment; and FIG. 12 is a flowchart illustrating the operation of a development environment with auto-generation of WSDL call flow implementation in accordance with an illustrative embodiment.

DETAILED DESCRIPTION OF THE ILLUSTRATIVE EMBODIMENTS

Figure 1:
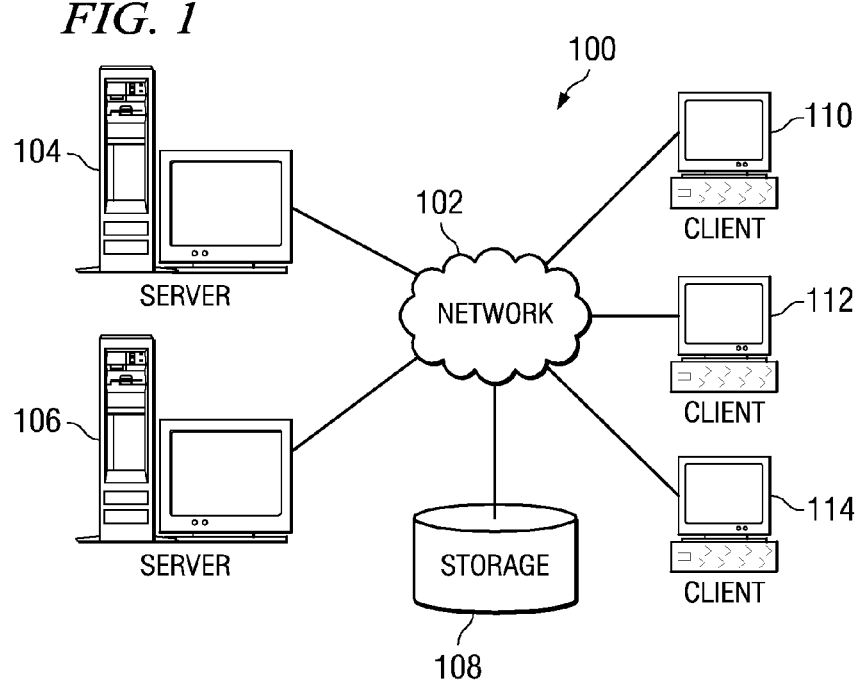
FIG. 1 depicts a pictorial representation of an exemplary distributed data processing system in which aspects of the illustrative embodiments may be implemented.
Figure 2:
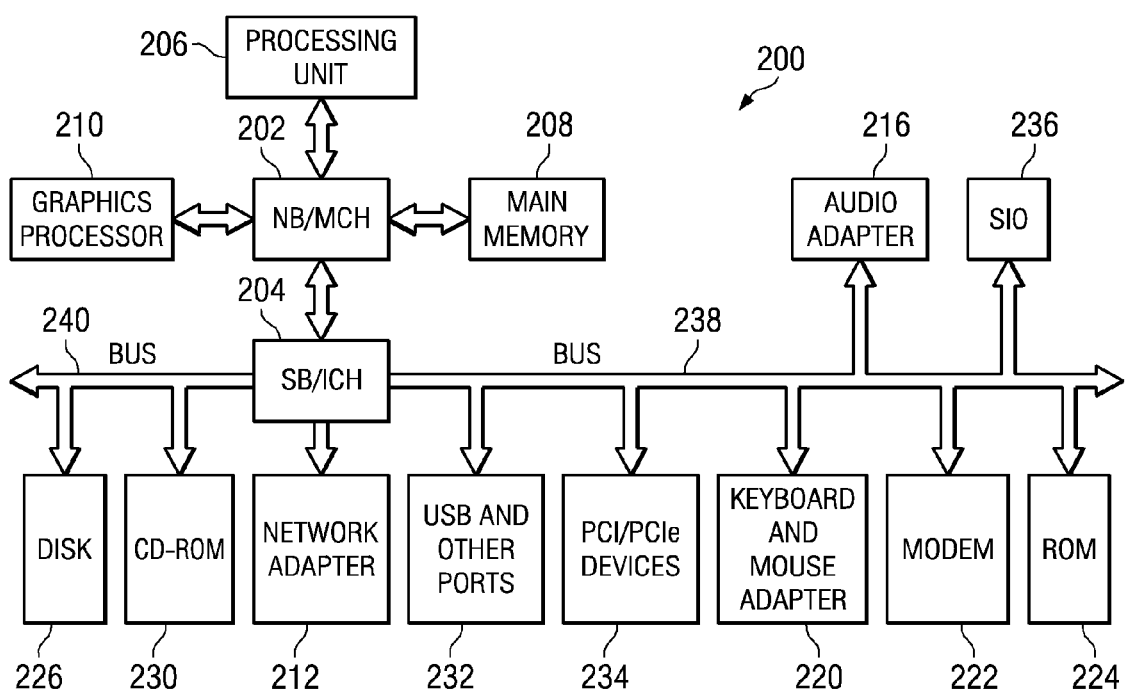
FIG. 2 is a block diagram of an exemplary data processing system in which aspects of the illustrative embodiments may be implemented.

The illustrative embodiments described hereafter provide a mechanism for extending Web services description language for session initiation protocol call flow interactions. As such, the illustrative embodiments may be implemented in a distributed data processing environment in which multiple computing devices are utilized along with one or more data networks. Accordingly, FIGS. 1 and 2 hereafter are provided as examples of a distributed data processing environment and computing devices in which exemplary aspects of the illustrative embodiments may be implemented. FIGS. 1 and 2 are only exemplary and are not intended to state or imply any limitation with regard to the types and/or configurations of computing devices in which the illustrative embodiments may be implemented. Many modifications to the computing devices and environments depicted in FIGS. 1 and 2 may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, servers 104 and 106 are connected to network 102 along with storage unit 108. In addition, clients 110, 112, and 114 are also connected to network 102. These clients 110, 112, and 114 may be, for example, personal computers, network computers, or the like. In the depicted example, server 104 may provide data, such as boot files, operating system images, and applications to the clients 110, 112, and 114. In this instance, clients 110, 112, and 114 are clients to server 104 in the depicted example. Distributed data processing system 100 may include additional servers, clients, and other devices not shown.

More particularly, distributed data processing system 100 may provide session initiation protocol (SIP) applications and Web services applications. Servers 104 and 106 may be members of a cluster. More particularly, a server, such as server 104, may run a SIP platform and a service-oriented architecture integration platform.

The illustrative embodiments extend Web services description language (WSDL) to allow for the merging of call flow XML with the interface description. This is accomplished through additional WSDL bindings for operations that associate an operation with segments or message points within the call flow. In addition, the extension to WSDL defines a set of interactions that provide additional semantics for how the operation interacts with the call flow. These interactions capture the interaction points between the WSDL. This allows for the same flexibility in interface design, including coarser granularity for business logic, while allowing for fine grained control of the call flow interaction points.

The proposed methodology in the illustrative embodiments is bi-directional. The WSDL interfaces that are created may be used for outbound interactions (i.e. initiated through Web services from some event within the call flow) or for the usual inbound request response. The illustrative embodiments may work with existing WSDL tooling and even allow for interface/call flow design independent of implementation.

In another illustrative embodiment, an additional lifecycle listener interface is used to convey different binding points between an enhanced converged Web service processing engine and a converged application implementation of the WSDL. The lifecycle events correspond to the binding interaction types and include a reference to the location in the call flow that triggered the lifecycle. A listener may be registered for the application in order to receive lifecycle events for the converged service implementation. This listener may be registered programmatically or within a deployment descriptor.

Given a SIP call flow definition and WSDL extended with SIP/call flow interactions, a converged application integration (CAI) engine provides service-oriented application practitioners with an ability to reuse existing Web services integration techniques in a new converged application integration green space. The converged application integration engine "wraps" a pre-existing converged Web service/SIP or a SIP-only application, listens to application-specific signaling, and based on a supplied WSDL with SIP/call flow extensions, makes and accepts interaction requests using Web services.

Given a SIP call flow definition, a WSDL extended with SIP/call flow interactions, and the converged application integration engine, a converged application execution (CAE) engine greatly eases developing new converged applications. At development time, a developer may decompose a SIP call flow definition into a set of SIP servlets and a set of Web service implementations. Each call flow segment may be decomposed into a SIP servlet. Each interaction may be backed by a JavaBeans™ backed Web service. At runtime, the CAE engine "stitches" the signaling onto the decomposed servlet model by following the WSDL extended with SIP/call flow interactions. At appropriate binding points, the CAE engine invokes the listener callback interfaces. The application performs whatever processing it needs to as a result of the callbacks, and then uses the CAE engine's support services to make outbound interaction invocations to any listening service integrator.

In another illustrative embodiment, the CAI engine uses a state format, which presents state within interaction requests/responses using an XML representation token from the WSDL with SIP/call flow extensions. The state format provides a very rich and expressive interface for manipulating calls during their complete lifecycle. The state format may include changes in the operation and changes in execution history since the last time an interaction occurred. The call flow change history may describe additional signaling/execution since the last outbound interaction.

The interface extensions to WSDL provide a significant amount of information regarding the implementation behavior of the network implementation. The interface also defines the semantics of the interface in such a way that, if the call flow is segmented into appropriate units, the core, high-level decision logic can be externalized into higher-level process tooling. Thus, in a further illustrative embodiment, the execution of each segment may be separated or delegated to generated code or to an interpretive engine. At each binding point, the control is passed to an external mechanism, such as a process server, to determine which segment to execute next. Information may be passed between the generated or interpreted application and the external world by including the last message contents (e.g., through SOAP attachments).

In a still further illustrative embodiment, the interface design tool may include a traditional call flow design view and a traditional WSDL interface design view. The call flow design view may allow for the grouping of the call flow into segments or exchanges, for labeling of each message in the segment. The tooling then allows for the creation of a mapping between WSDL operations and the call flow. The mapping may be labeled with the interaction type. The output of the visual artifacts may then be a WSDL and call flow XML document, where the additional bindings are included for the operations that capture the interaction relationships.

In the depicted example, distributed data processing system 100 is the Internet with network 120 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 102 or client 112 in FIG. 1, in which computer usable code or instructions implementing the processes for illustrative embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, video game consoles, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments extend Web services description language (WSDL) to allow for the merging of call flow XML with the interface description. In addition to the usual WSDL structure, such as types, message types, port types, interfaces, bindings, etc., each WSDL document is associated with some call flow XML. This XML may be imported from another XML document or embedded directly into the WSDL document. The call flow describes the various interactions between the application and other network elements. FIG. 3 illustrates an example session initiation protocol (SIP) application call flow in accordance with an exemplary embodiment.

The call flow may also be divided into segments. For the call flow depicted in FIG. 3, steps 1-3 may be considered segment 1, steps 4-9 may be segment 2, and the "bye" steps (not shown) may be segment 3. Additional segments may also be used for in-call signaling. Note that this call flow implies a data flow as well between messages. For the implementation of the illustrative embodiments, it may be desirable to annotate the call flow to indicate the data flow as well.

In a typical simple object access protocol (SOAP) Web service binding, each operation has an associated SOAP binding for the operation. FIG. 4A depicts a Web services description language interface binding in accordance with an illustrative embodiment. The operation is joined to the SIP call flow through the use of additional call flow bindings.

FIG. 4B depicts a Web services description language interface binding with call flow bindings in accordance with an illustrative embodiment. The call flow binding, such as call flow binding 412, associates the operation with a point in a call flow segment and message point. This gives the operation additional meaning. Anyone who looks at the interface will now have a better idea of what the operation is actually doing in implementation and to which interactions it belongs. The call flow can also become the contract for the implementation.

Execution of the application can now begin in two ways: either through network events (for some applications) or through an operation that kicks off a call flow segment. Execution then proceeds until the next binding point, at which point the action to be taken depends on the binding interaction type. The interaction helps provide additional semantics to the operation that can be used for determining how the operation is meant to be used. The prior art WSDL interface description is not descriptive enough to capture the usage scenarios.

A key enabler in this approach is the definition of interactions. Interactions describe the context in which the implementation expects the method to occur. The following interactions are defined:

Query: Queries for the state of the call flow. The state is meaningfully defined in terms of the call flow associated with the WSDL. This can be used to query the current state of the execution flow and be able to place meaningful results. There are several ways to represent state, such as in terms of previous segments executed, in terms of protocol precedence exchanges, etc.

Notify: Indicates that a notification should be sent from the service implementation to the implementer of the notification indicating that a point in the application has occurred, e.g., call setup has completed. Notifications are asynchronous relative to the execution of the call flow.

Direct: This pauses execution of the call flow to call out to an external Web service endpoint to receive direction using bound operation. This may be an actual SOAP Web service invocation or a Java M binding.

Prescribe: This indicates that the ooperation will provide descriptive rules as to how to make decisions within the flow of execution. Prescribe rules may be evaluated at segment points to determine which segment to move in. This may be called at any time, such as at setup time.

Act: This kicks off a segment of the call flow. This operation may then be used to kick off the call flow or send additional signaling in-flow, such as terminating the call.

These WSDL extensions can be used to provide an additional interface contract for implementations or to be enforced by the Web services infrastructure.

An additional extension to the call flow binding is the "state" attribute. The state attribute may be used when matching bindings to points in the call flow. FIG. 4C illustrates call flow bindings using a state attribute in accordance with an exemplary embodiment. The example depicted in FIG. 4C illustrates how states may be indicated by specifying previous segments. More elaborate state specification schemes may be used. A binding will only be applied if its state matches. An operation may also have multiple bindings, which effectively associates a sequence of segments with an operation.

In addition, SIP message information may be sent to and from the call flow implementation along with operations to help in directing the call flow. Two mechanisms that may be used are XML representations of the SIP message and SOAP attachments. SOAP attachments reduce the cost of piggybacked lower-level SIP messages.

FIG. 5 illustrates a listening interface in accordance with an illustrative embodiment. An additional lifecycle listener interface is used to convey different binding points between an enhanced converged Web service processing engine and a converged application implementation of the WSDL. The listener implementation gets invoked each time the Web service processing engine matches a binding point in the call flow execution to the WSDL. Notice that the enhanced converged Web service processing engine can see both Web service and call flow related requests. For operations that can be processed by the generated Web service binding, only a notification of the action is provided, invoked right before the operation is called. For outbound actions, the listener is the only indicator that an external call must be made.

Prior art approaches to service-oriented architecture (SOA) based integration know nothing about SIP signaling. Given an existing converged Web service/SIP or SIP-only application, system integrators need the ability to interact with the application at granularities appropriate for process server and the SOA programming model. Prior art approaches to SOA-based converged SIP/Web services application development rely upon tooling that comes from one of those technical traditions. Writing a well-structured, robust, maintainable, etc. converged application is difficult because prior art application development practices are geared toward SIP or Web services development independently. Developing an application that does both is difficult.

FIG. 6 is a block diagram illustrating a converged application integration engine in accordance with an illustrative embodiment. Converged application integration (CAI) engine 620 "wraps" pre-existing converged Web service/SIP application 622. Using listener interface 624, CAI engine 620 listens to application-specific signaling and, based on the supplied WSDL with SIP/call flow extensions, makes and accepts interaction requests using Web services in SOA integration platform 630.

CAI engine 620 has several advantages. A SOA practitioner can use an existing platform 630, tooling, and techniques to integrate with the platform, because CAI engine 620 gives the practitioner a Web service-friendly view of the converged application's operation. No SIP-specific knowledge is needed after the SIP/call flow WSDL has been created. Because CAI engine 620 works from the call flow description, CAI engine 620 may be bolted onto existing application 622 without requiring any application-level changes. Any pre-existing application signaling can have different interaction granularities within its SIP/call flow WSDL. Integrators may choose the granularity of the interactions based on the segments they define. For example, one services engagement may require a Notify interaction on phone call initiation and termination and another may require a Notify interaction on every single SIP message.

CAI engine 620 consumes the WSDL with SIP/call flow extensions, which describes the signaling used by any pre-existing converged Web service/SIP or SIP-only application, such as application 622. CAI engine 620, using listener interface 624, listens to the signaling sent between pre-existing application 622 and its clients, including all inbound and outbound SIP signaling and Web service invocations. Listener interface 624 is as described above with respect to FIG. 5. As signaling occurs within a call flow in SIP platform 610, CAI engine 620 tracks transitions between call flow segments and maintains state information in storage 626.

When a call flow in SIP platform 610 reaches an interaction defined within the extended WSDL (e.g., Notify or Direct), CAI engine 620 makes an outbound Web service invocation for the appropriate interaction with relevant state information. At any time, CAI engine 620 may receive an inbound Web service invocation requesting or modifying relevant state information (e.g., Query, Prescribe, Act).

When CAI engine 620 consumes the WSDL with SIP/call flow extensions, it generates SIP servlets and JavaBeans™ backed Web service implementations, both of which may run in a WebSphere® converged HTTP/SIP container, for example. The generated SIP servlets behave as simple record-routing proxies. On each incoming initial request, the SIP servlets proxy the request to its original destination. On each incoming response or subsequent request, the SIP servlet functionality ensures the message reaches the target mandated by the SIP protocol. The Web service implementation acts as a back-to-back/man-in-the-middle and invokes the original Web service endpoint.

As a Web service makes a request or SIP messages flow through the generated code, the code retrieves the appropriate session objects (HttpSession, SipSession, SipApplicationSession) and updates the relevant state information, such as, for example, message content, time between messages, etc.

When the state reaches a point with a Notify or Direct interaction defined, the generated servlets invoke the Notify or Direct Web service interaction request on the standard integration platform 630. The Notify interaction includes the state of the call flow. The Direct interaction includes the state of the call flow, and CAI engine 620 uses the response from integration platform 630 to modify its internal state.

At any time, integration platform 630 may invoke the Query interaction on CAI engine 620, which responds with the current call flow state. Integration platform 630 may also invoke the Prescribe interaction on CAI engine 620 with prescribed state information. CAI engine 620 stores this state information in storage 626, and will restore it when receiving a relevant, initial request bound for the application or coming from the application. This may take the form of information serialized to a datasource, which is later queried and restored into the session objects when an initial request is received. Integration platform 630 may invoke the Act interaction on CAI engine 620 with prescribed state information. CAI engine 620 will pass the Act interaction to the underlying application 622, and the application must be coded to understand it. Alternatively, integration platform 630 may directly invoke any Web service operation that application 622 possesses.

FIG. 7 is a block diagram illustrating a converged application execution engine in accordance with an illustrative embodiment. Given a SIP call flow definition, a WSDL extended with SIP/call flow interactions, and the converged application integration (CAI) engine shown in FIG. 6, converged application execution (CAE) engine eases development of new converged applications. At development time, a developer decomposes the SIP call flow definition into a set of SIP servlets and a set of Web service implementations. Each call flow segment is decomposed into a separate SIP servlet. Each of the Query, Prescribe, and Act interactions is backed up by a JavaBeans™ backed Web service. The Notify and Direct operations, because they are outbound from an application's perspective, use support services provided by CAE engine 720. The logic a developer inserts into individual servlets capitalizes on listener interface 724, described above with respect to FIG. 5.

At runtime, CAE engine 720 "stitches" the signaling onto the decomposed servlet model by following the WSDL extended with SIP/call flow interactions. At the appropriate binding points, CAE engine 720 invokes listener callback interfaces 724. For example, CAE engine 720 may invoke onNotify when passing control between two SIP servlets due to a call segment completion. Application 722 performs whatever processing it needs to as a result of the callbacks and then uses the CAE engine 720 support services to make an outbound Notify or Direct interaction invocation to any listening service integrator.

Based on an application's intended signaling, CAE engine 720 provides a well-defined structure for rapidly developing converged applications. By having SIP/call flows decomposed into servlets, developers are encouraged to have one servlet process for one useful piece of signaling. This reduces the tendency to produce monolithic SIP servlets, reducing code complexity and easing test and maintenance. Because CAE engine 720 provides application 722 with contextual state in storage 726 during callbacks (e.g., onNotify, onDirect), the application developer does not have to invest effort into maintaining the current signaling state. CAE engine 720 maintains the state in storage 726 for the developer and presents it in an easily consumable form regardless of the signaling complexity. Without CAE engine 720, the developer must spend time developing the relevant state history logic with richer functionality requiring more development time.

Because Web service invocations are treated like other types of signaling and described using a common interface, the developer does not have to invest effort adding Web service request history/details into the SIP signaling state. Again, CAE engine 720 does this on behalf of the developer.

Because CAE engine 720 follows the Query, Notify, Direct, Act, Prescribe paradigm, CAE engine 720 allows converged application developers and converged application integrators to speak the same language when discussing converged functionality. CAE-based applications get the CAI integration points for free, encouraging their reuse with an SOA ecosystem. From the outside, a CAE-application looks just like a non-CAE application wrapped by a CAI engine. This improves on the return on the development dollar, because organizations can more easily export CAE-enabled applications for external consumption. CAE engine 720 is an incremental piece of work beyond the CAI engine.

Tooling build for CAE engine 720 consumes WSDL with SIP/call flow extensions designed for new application 722. The tooling generates the appropriate J2EE/SIP artifacts based on decomposing the SIP/call flow into call segments. The application developer takes those artifacts and fills in the appropriate business logic. The application developer packages those artifacts with a CAE-specific deployment descriptor. This descriptor indicates the WSDL with SIP/call flow in use, the appropriate application state model, and any listeners that should be registered with CAE engine 720 at runtime.

At runtime, CAE engine 720 behaves as a controller that intercepts all incoming signaling, SIP signaling from SIP platform 710 or Web service signaling from integration platform 730. CAE engine 720 updates its internal state prior to invoking the underling application logic.

As a call flow segment completes in SIP platform 710, CAE engine 720 automatically directs signaling to the appropriate SIP servlet within the decomposed implementation. When a call flow reaches an interaction defined within the extended WSDL, e.g., Notify or Direct, it invokes the defined application listener 724. The application may make outbound Web service invocations to integration platform 730 for the appropriate interaction with relevant state information from storage 726. For Direct interactions, application 722 "sees" the external system's response and can update its state accordingly. At any time, CAE engine 720 may receive an inbound Web service invocation requesting or modifying relevant state information, e.g., Query, Prescribe, or Act. After pre-populating the information it knows (e.g., the signaling history, the state change since the last time the interaction occurred), CAE engine 720 passes these on to application 722 to process.

The interface extensions to WSDL provide a significant amount of information regarding the implementation behavior of the network implementation. The interface also defines the semantics of the interface in such a way that, if the call flow is segmented into appropriate units, the core, high-level decision logic can be externalized into higher level process tooling. The execution of each segment may be delegated to generated code or to an interpretive engine. At each binding point, the control is passed to an external mechanism, such as a process server, to determine which segment to execute next. Information is passed between the generated or interpreted application and the external world by including the last message contents.

In generation mode, each call flow segment described within the interface would correspond to a generated SIP servlet. Segments should be independently executable, such as SIP transactions. These segments would be chosen such that the data flow between segments is implied and scoped. Hand-off between segments would be accomplished by using a mechanism, such as the SIP servlet setHandler( ) method.

Three binding interaction types may apply to this model: Direct, Prescribe, Act. For Direct and Prescribe, execution may continue until an initial binding point is reached, typically at the end of a segment. At such a point, if the binding interaction is Direct, a call out will be made to determine which segment to execute next. The call out will provide the last SIP message attached (through, for example, a SOAP attachment), and the direction to the next segment will also take an attachment that provides the input message to the segment. If the binding point is Prescribe, then the associated rule will be consulted to determine which segment to execute next. An Act interaction could also be used to asynchronously kick off a call flow segment, either in a dialog or a new interaction (such as termination).

The generated application would be converged application and use session affinity to direct incoming requests to the same application server in a cluster where the generated code is executing. This simplifies the generation model, allowing the generated code to focus on the logic and letting the application server layer handle load-balancing, fail-over, etc.

The state information sent between the CAI engine and a system integrator must be sufficiently rich without burdening the integrator or the integration platform. The integrator should not have to understand all of the nuances of SIP. The purpose of the CAI engine is to avoid pushing SIP comprehension and complexity out to the integration platform. The integrator should receive as much signaling information as possible. This allows the integrator to do smarter things if he/she does understand SIP signaling. The integration platform should not suffer performance problems while parsing/processing the information. Because underlying applications may be highly stateful, the information provided should help the integrator to "keep his place." The pre-existing application already has to maintain all of that information. There is no need for the integration platform/integrator to have to also maintain that information.

Prior art solutions tend to push XML- or object-based SIP messages into the integration platform. This forces the integration platform to parse/process a representation of SIP messages. Most of the time, that level of granularity is not necessary, and forcing the integration platform to pay the parsing/memory costs is overkill. Prior art solutions also pass "stateless," or nearly stateless, messages to the integration platform. For an integrator to take any intelligent choices requires the integrator to locally maintain the state history. This is a needless implementation burden that will spawn many trivial variations and make reuse difficult.

In accordance with one illustrative embodiment, a state format is provided to be used within the CAI engine's Notify, Direct, Query, Prescribe, and Act operations. That format presents state within interaction requests/responses using an XML representation taken from the WSDL with SIP/call flow extensions. This state format is combined with the Query, Notify, Direct, Prescribe, Act paradigm to provide a very rich/expressive interface for manipulating calls during their complete lifecycle For Notify and Direct interactions, the state format includes the changes in the operation parameters and changes in execution history (as defined in the call flow) since the last time a Notify or Direct occurred. The call flow change history describes the additional signaling/execution since the last outbound notification/direction interaction. For Query interactions, the state format includes the changes in operation parameters and changes in execution history (as defined in the call flow) since the last time the requester invoked the same operation. For example, a Query may include all changes since the last time a Query was issued for the same call. For Act and Prescribe interactions, the state format may include changes in operation parameters, but likely not execution history.

The state format of the illustrative embodiment uses the WSDL with SIP/call flow extensions as the basis for its state information, the integrator works with the same level of granularity/abstraction that was taken when modeling the pre-existing application behavior. If necessary, the integrator can work with the underlying signaling using the SOAP attachment. This allows the integrator access down to the SIP byte level if requirements demand it. Because the gory signaling details ride as a SOAP attachment, SOAP engines are not forced to parse or comprehend them when processing inbound Notify, Direct, etc. interaction Web service requests. Because Notify, Direct, and Query state information includes a change history since the last time the integration platform received a Notify, Direct, or Query request, integrators have an easy time implementing do-something-only-if-X-changed behaviors.

Prior art tooling treats Web service interface and converged application design separately. This increases complexity of converged application design, as the two interfaces need to be reconciled in implementation. In accordance with on illustrative embodiment, an interface design tool includes a traditional call flow design view (such a view might use sequence diagrams of message exchanges within the call flow) and a traditional WSDL interface design view. The call flow design view may allow for the grouping of the call flow into segments of exchanges, and also allow for labeling of each message in the segment, such as a unique number or alphanumeric label. The tooling allows the creator to map between WSDL operations and the call flow. The mapping may be labeled with the interaction type. The output of the visual artifacts may be a WSDL and call flow XML document, where the additional bindings are included for the operations that capture the interaction relationships.

Figure 8:
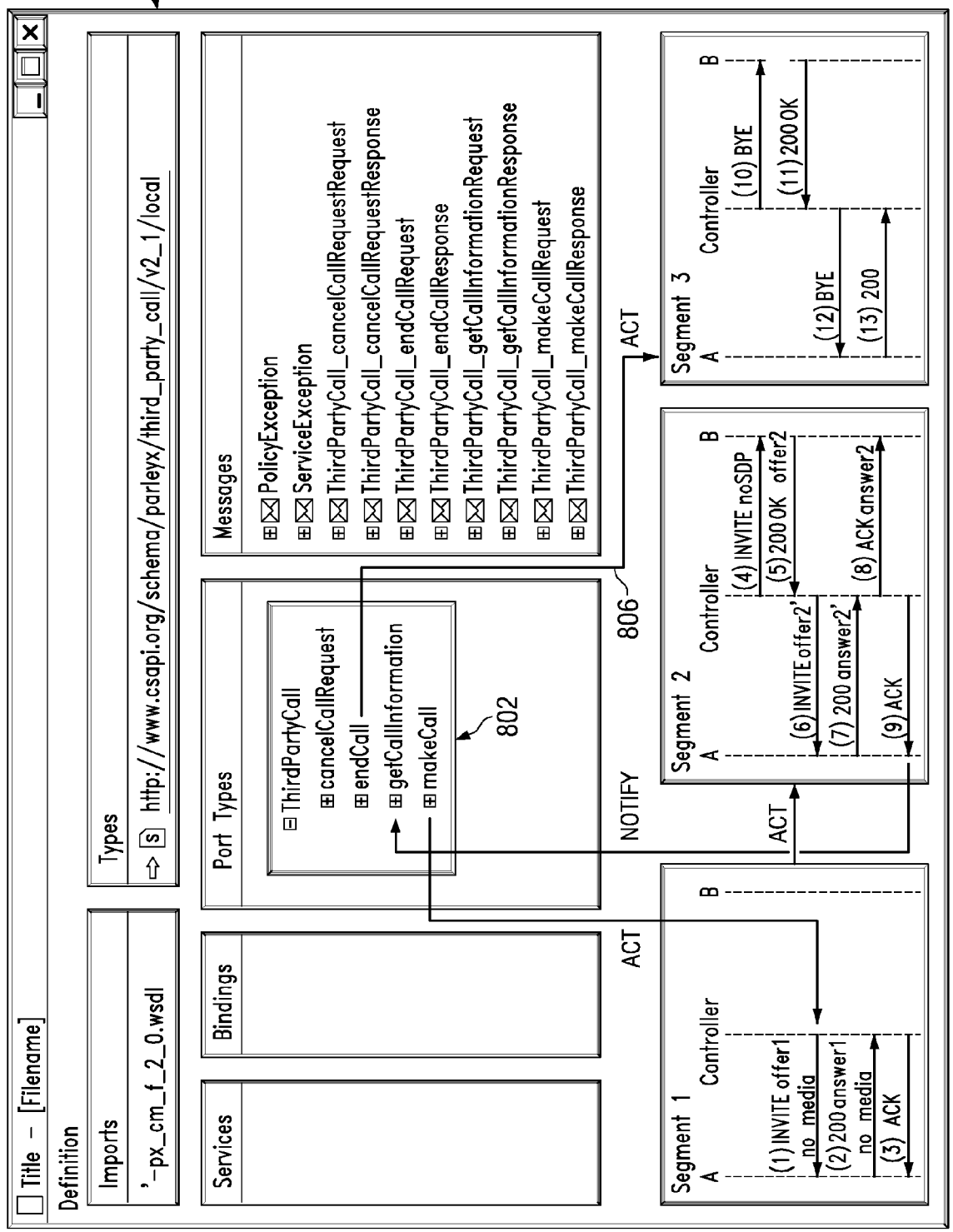
FIG. 8 depicts an interface design tool user interface in accordance with an illustrative embodiment.

FIG. 8 depicts an interface design tool user interface in accordance with an illustrative embodiment. Interface design tool window 800 includes a WSDL interface design portion 802 and a plurality of call flow segment design portions 804. A developer may map a WSDL element with call flow step or message using a rubber-band tool, for example. For instance, rubber-band component 806 represents a mapping between "endcall" WSDL component and step 10 in segment 3. This mapping is also labeled as an "Act" interaction.

Figure 9:
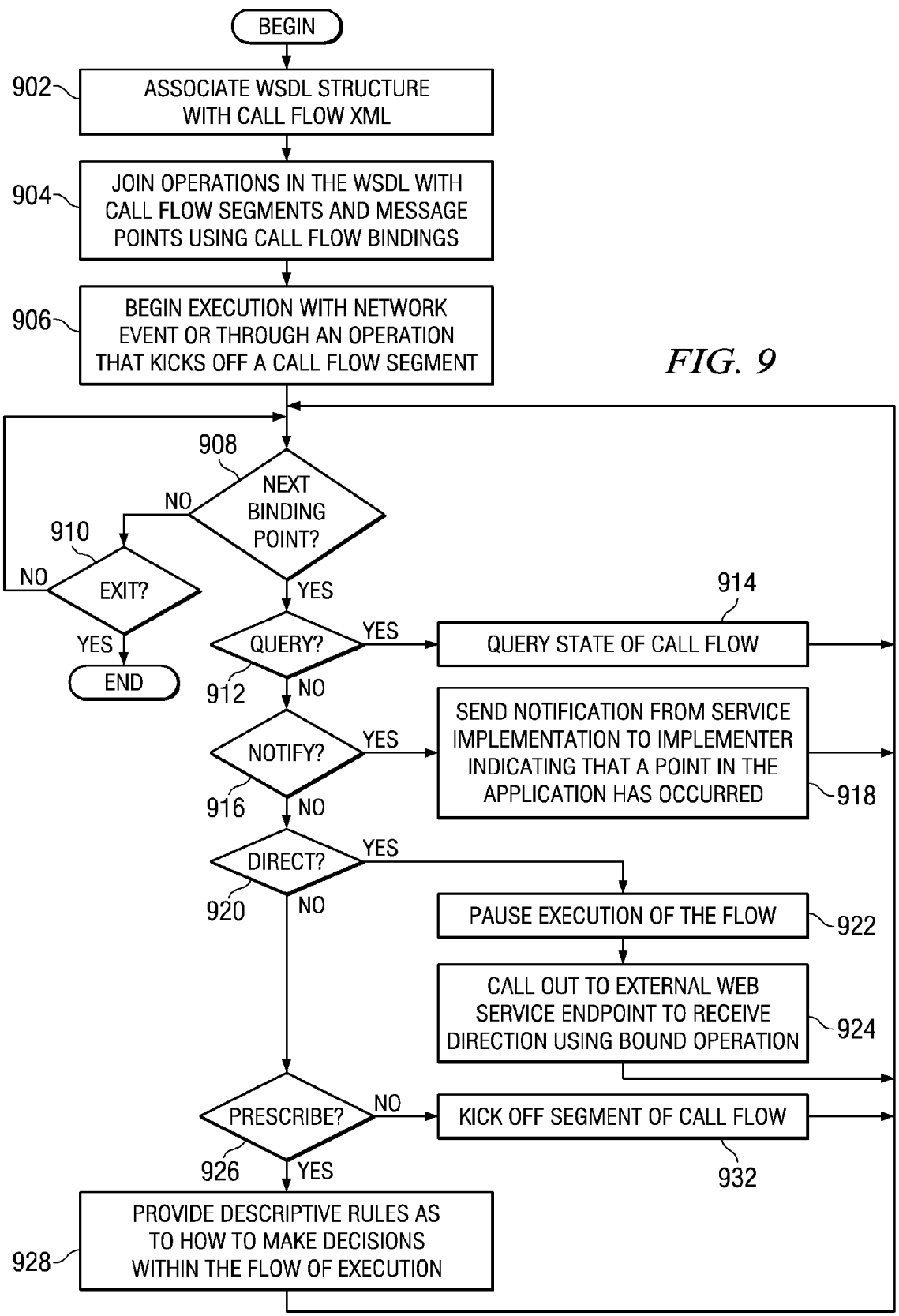
FIG. 9 is a flowchart illustrating operation of a converged application with extended Web service description language in accordance with an illustrative embodiment.

FIG. 9 is a flowchart illustrating operation of a converged application with extended Web service description language in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference to FIG. 9, operation begins and a developer associates a Web service description language (WSDL) structure with call flow extensible markup language (XML) (block 902). The developer joins operations in the WSDL with call flow segments and message points using call flow bindings (block 904). The developer may join operations using an interface design tool, such as that shown in FIG. 8, for example.

Next, the converged application begins execution in a converged application integration (CAI) engine or converged application execution (CAE) engine, with a network event or through an operation that kicks off a call flow segment (block 906). The CAI or CAE engine determines whether a next binding point is reached (block 908). If a next binding point is not reached, the CAI or CAE engine determines whether an exit condition exists (block 910). An exit condition may exist, for example, if the application completes execution or the server shuts down. If an exit condition does not exist, operation returns to block 908 to determine whether a next binding point is reached. If an exit condition exists in block 910, operation ends.

Returning to block 908, if a next binding point is reached, then the CAI or CAE engine determines whether the interaction type is a Query (block 912). If the interaction type is Query, the CAI or CAE engine queries the state of the call flow (block 914). Thereafter, operation returns to block 908 to determine whether a next binding point is reached.

If the interaction type is not Query, the CAI or CAE engine determines whether the interaction type is Notify (block 916). If the interaction type is Notify, the CAI or CAE engine sends a notification from service implementation to the implementer indicating that a point in the application has occurred (block 918). Thereafter, operation returns to block 908 to determine whether a next binding point is reached.

If the interaction type is not Notify, the CAI or CAE engine determines whether the interaction type is Direct (block 920). If the interaction type is Direct, the CAI or CAE engine pauses execution of the call flow (block 922), and calls out to the external Web service endpoint to receive direction using bound operation (block 924). Thereafter, operation returns to block 908 to determine whether a next binding point is reached.

If the interaction type is not Direct, the CAI or CAE engine determines whether the interaction type is Prescribe (block 926). If the interaction type is Prescribe, the CAI or CAE engine provides descriptive rules as to how to make decisions within the flow of execution (block 928). Thereafter, operation returns to block 908 to determine whether a next binding point is reached.

If the interaction type is not Prescribe, then the interaction type is Act, and the CAI or CAE engine kicks off a segment of the call flow (block 932). Thereafter, operation returns to block 908 to determine whether a next binding point is reached.

Figure 10:
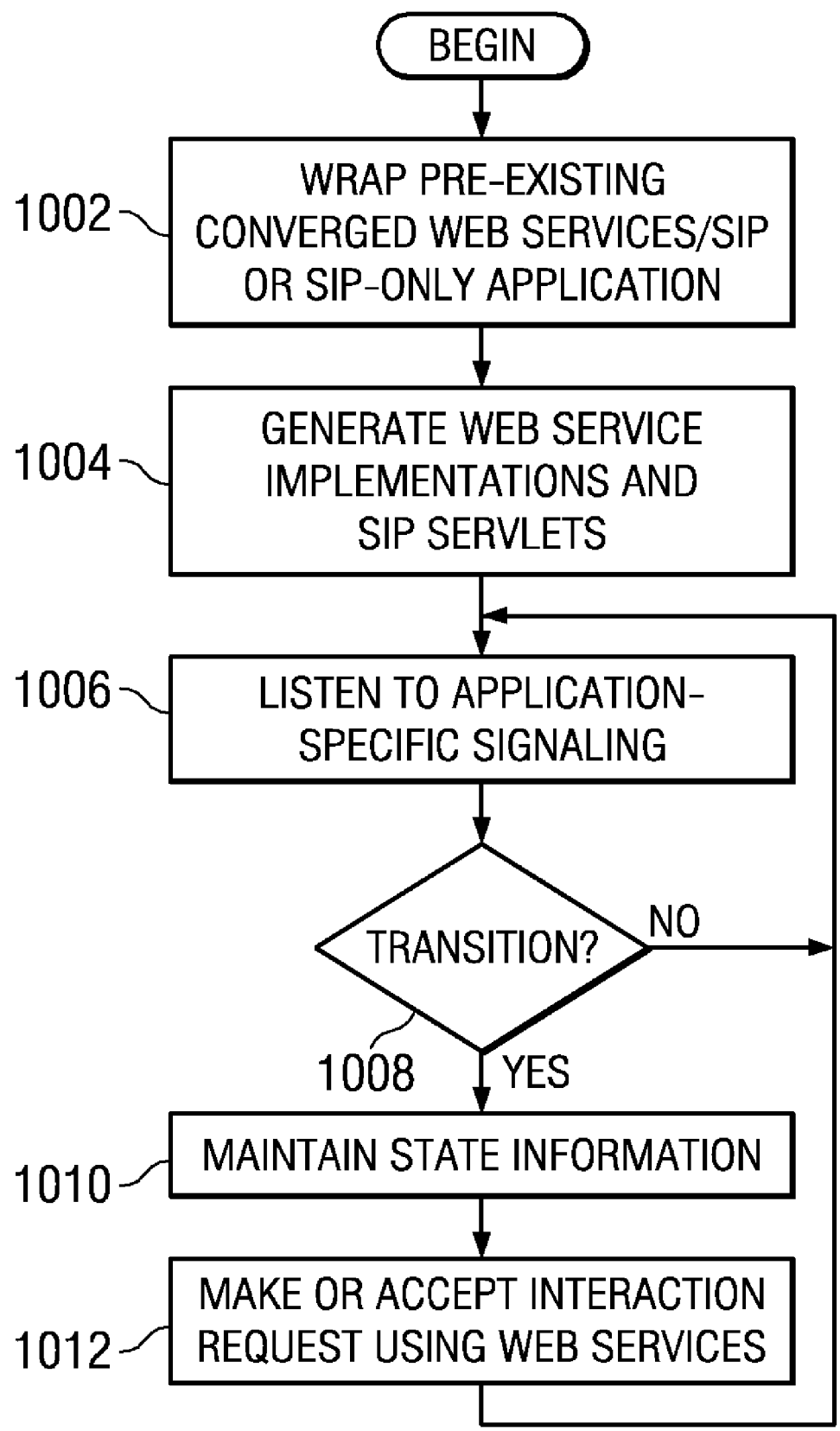
FIG. 10 is a flowchart illustrating operation of a pre-existing converged application in accordance with an illustrative embodiment.

FIG. 10 is a flowchart illustrating operation of a pre-existing converged application in accordance with an illustrative embodiment. Operation begins and a developer wraps a pre-existing converged Web services/SIP or SIP-only application in a converged application integration (CAI) engine (block 1002). Then, the CAI engine generates Web service implementations and SIP servlets (block 1004). The CAI engine listens to application-specific signaling (block 1006) and determines whether a transition is reached (block 1008).

If a transition is not reached, operation returns to block 1006 to listen to application-specific signaling. If a transition is reached in block 1008, the CAI engine maintains state information (block 1010). The CAI engine makes or accepts an interaction request using Web services (block 1012). Thereafter, operation returns to block 1006 to listen to application-specific signaling.

FIG. 11 is a flowchart illustrating operation of a new converged application in accordance with an illustrative embodiment. Operation begins and a developer decomposes a SIP call flow definition into a set of SIP servlets and a set of Web service implementations (block 1102). Then, the developer fills in the business logic (block 1104) and packages the artifacts, including the WSDL for the converged application, the SIP servlets, and the Web service implementations, with converged application execution (CAE) engine specific deployment descriptors (block 1106). The deployment descriptors indicate the extended WSDL+SIP call flow in use, the appropriate application state model, and any listeners that should be registered with the CAE engine at runtime.

Next, at runtime, the CAE engine consumes the WSDL for the converged application (block 1108), and the CAE engine registers listeners (block 1110). The CAE engine listens to application-specific signaling (block 1112) and determines whether a transition is reached (block 1114). If a transition is not reached, operation returns to block 1112 to listen to application-specific signaling. If a transition is reached in block 1114, the CAE engine maintains state information (block 1116), and the CAE engine makes or accepts an interaction request using Web services (block 1118). Thereafter, operation returns to block 1112 to listen to application-specific signaling.

Prior art approaches to the creation of converged services require substantial network expertise for writing SIP servlets. In addition, Web services interfaces tend to interact with the application through a higher level interface, and, thus, the implementation must work to support the abstraction. This is a time consuming process, and the creator of the converged service must make use of full-fledged programming environments to produce call flow logic, such as SIP servlets, addressable through this abstraction.

The interface extensions to WSDL of the illustrative embodiments described above provide a significant amount of information regarding the implementation behavior of the network implementation. The interface also defines the semantics of the interface in such a way that if the call flow is segmented into appropriate units, the core, high-level decision logic can be externalized into higher level process tooling. The illustrative embodiments may capitalize on this separation by delegating the execution of each segment to generated code or to an interpretive engine. At each binding point, the control may be passed to external means, such as a process server, to determine which segment to execute next. Information is passed between the generated or interpreted application and the external world by including the last message contents, e.g., through SOAP attachments.

FIG. 12 is a flowchart illustrating the operation of a development environment with auto-generation of WSDL call flow implementation in accordance with an illustrative embodiment. Operation begins and the development tooling receives the extended WSDL with SIP/call flow interactions (block 1202). For certain narrowly scoped message exchanges in the call flow, it would be easy to generate an implementation. Thus, in accordance with the illustrative embodiment, the development tooling allows the user to select trivial message exchanges in the call flow (block 1204).

SIP servlets provide the infrastructure for communicating with the network. The development tooling may generate these servlets automatically to form a template form of the application that will execute in the converged application engine. Alternatively, the development tooling may generate a template form of the application that may be interpreted in an interpretive engine.

This template form of the application may be, for example, converged Web service/SIP application 722 in FIG. 7. The user may then drop in higher level business logic (block 1208). Thereafter, operation ends. Web services provide the higher level controlling logic, also referred to as business logic, for the application. For example, the Web services may determine which segment of the call flow to execute next. The automatically generated SIP servlets, or template form of the application to be interpreted, are configured to pass to the Web services information, including the last message contents. In one exemplary embodiment, the automatically generated code may pass this information using SOAP attachments, for instance.

Thus, the development tooling automatically generates a template form of the application (block 1206). In generation mode, each call flow segment described within the interface would correspond to a generated SIP servlet. Segments should be independently executable, such as SIP transactions. Consider the following example: INVITE->100-180->200->OK (both initial and re-INVITE), SUBSCRIBE->OK->NOTIFY->OK, forking INVITEs, NOTIFY->OK, BYE->OK, etc. Typically, these segments would be chosen such that the data flow between segments is implied and scoped, as is chosen in the above examples. Hand-off between segments would be accomplished by using a mechanism, such as the SIP servlet setHandler( ) method.

Three binding interaction types typically apply to this model: Direct, Prescribe, act. For Direct and Prescribe, execution will continue until an initial binding point is reached, typically at the end of a segment. At such a point, if the binding interaction is Direct, a call out will be made to determine which segment to execute next. The call out will provide the last SIP message attached, through, for example, SOAP attachments. The direction to the next segment will also take an attachment that provides the input message to the segment. If the binding point is Prescribe, then the associated rule will be consulted to determine which segment to execute next. An Act interaction could also be used to asynchronously kick off a call flow segment, either in dialog or a new interaction, such as termination.

The generated application would be a converged application. The application may use session affinity to direct incoming requests to the same application server in a cluster where the generated code is executing. This simplifies the generation model, allowing the generated code to focus on the logic and allowing the application server to handle load-balancing, fail-over, etc.

The interpretive execution of a call flow implementation may be similar to the generated methodology. An interpreted implementation may be executed by a call flow engine, such as International Business Machine's WebSphere® Voice Server, for instance.

Thus, the illustrative embodiments solve disadvantages of the prior art by providing extended Web services description language (WSDL) to allow for the merging of call flow XML with the interface description. This is accomplished through additional WSDL bindings for operations that associate an operation with segments or message points within the call flow. In addition, the extension to WSDL defines a set of interactions that provide additional semantics for how the operation interacts with the call flow. These interactions capture the interaction points between the WSDL. This allows for the same flexibility in interface design, including coarser granularity for business logic, while allowing for fine grained control of the call flow interaction points.

The proposed methodology in the illustrative embodiments is bi-directional. The WSDL interfaces that are created may be used for outbound interactions (i.e. initiated through Web services from some event within the call flow) or for the usual inbound request response. The illustrative embodiments may work with existing WSDL tooling and even allow for interface/call flow design independent of implementation.

An additional lifecycle listener interface is used to convey different binding points between an enhanced converged Web service processing engine and a converged application implementation of the WSDL. The lifecycle events correspond to the binding interaction types and include a reference to the location in the call flow that triggered the lifecycle. A listener may be registered for the application in order to receive lifecycle events for the converged service implementation. This listener may be registered programmatically or within a deployment descriptor.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for extending Web services to include call flow interactions, the method comprising:
    receiving a description language document that describes one or more Web services interface components;
    associating a Web services interface component within the one or more Web services interface components with one or more call flow segments;
    inserting a call flow binding into the description language document to form an extended description language document, wherein the call flow binding associates an interaction operation with a binding point in a given call flow segment within the one or more call flow segments; and
    executing a converged application based on the extended description language document.

2. The method of claim 1, wherein the call flow binding is a simple object access protocol binding.

3. The method of claim 1, wherein the interaction operation is a query operation, the method further comprising:
    responsive to receiving an invocation from a service oriented architecture integration platform, querying the given call flow segment for state information.

4. The method of claim 1, wherein the interaction operation is a notify operation, the method further comprising:
    responsive to reaching the binding point in the given call flow segment, sending a notification to the Web services interface component.

5. The method of claim 1, wherein the interaction operation is a direct operation, the method further comprising:
    responsive to reaching the binding point in the given call flow segment, pausing execution of the call flow segment; and
    calling out to an external Web service endpoint to receive direction using bound operation.

6. The method of claim 1, wherein the interaction operation is a prescribe operation, the method further comprising:
    responsive to receiving an invocation from a service oriented architecture integration platform, receiving a set of descriptive rules for decision making within the call flow segment.

7. The method of claim 1, wherein the interaction operation is an act operation, the method further comprising:
    responsive to receiving an invocation from a service oriented architecture integration platform, initiating execution of the given call flow segment.

8. The method of claim 1, further comprising:
    providing a listener corresponding to the binding; and
    responsive to execution of the converged application matching the binding, invoking the listener.

9. A computer program product comprising a computer useable medium having a computer readable program, wherein the computer readable program, when executed on a computing device, causes the computing device to:
    receive a description language document that describes one or more Web services interface components;
    associate a Web services interface component within the one or more Web services interface components with one or more call flow segments;
    insert a call flow binding into the description language document to form an extended description language document, wherein the call flow binding associates an interaction operation with a binding point in a given call flow segment within the one or more call flow segments; and
    execute a converged application based on the extended description language document.

10. The computer program product of claim 9, wherein the interaction operation is a query operation, wherein the computer readable program, when executed on a computing device, further causes the computing device to:
    responsive to receiving an invocation from a service oriented architecture integration platform, query the given call flow segment for state information.

11. The computer program product of claim 9, wherein the interaction operation is a notify operation, wherein the computer readable program, when executed on a computing device, further causes the computing device to:
    responsive to reaching the binding point in the given call flow segment, send a notification to the Web services interface component.

12. The computer program product of claim 9, wherein the interaction operation is a direct operation, wherein the computer readable program, when executed on a computing device, further causes the computing device to:
    responsive to reaching the binding point in the given call flow segment, pause execution of the call flow segment; and
    call out to an external Web service endpoint to receive direction using bound operation.

13. The computer program product of claim 9, wherein the interaction operation is a prescribe operation, wherein the computer readable program, when executed on a computing device, further causes the computing device to:
    responsive to receiving an invocation from a service oriented architecture integration platform, receive a set of descriptive rules for decision making within the call flow segment.

14. The computer program product of claim 9, wherein the interaction operation is an act operation, wherein the computer readable program, when executed on a computing device, further causes the computing device to:
    responsive to receiving an invocation from a service oriented architecture integration platform, initiate execution of the given call flow segment.

15. A data processing system for extending Web services to include call flow interactions, comprising:
    a processor; and a memory coupled to the processor, wherein the memory contains instructions which, when executed by the processor, cause the processor to:
   receive a description language document that describes one or more Web services interface components;
   associate a Web services interface component within the one or more Web services interface components with one or more call flow segments;
   insert a call flow binding into the description language document to form an extended description language document, wherein the call flow binding associates an interaction operation with a binding point in a given call flow segment within the one or more call flow segments; and
   execute a converged application based on the extended description language document.

16. The data processing system of claim 15, wherein the interaction operation is a query operation, wherein the instructions further causes the processor to:
   responsive to receiving an invocation from a service oriented architecture integration platform, query the given call flow segment for state information.

17. The data processing system of claim 15, wherein the interaction operation is a notify operation, wherein the instructions further causes the processor to:
   responsive to reaching the binding point in the given call flow segment, send a notification to the Web services interface component.

18. The data processing system of claim 15, wherein the interaction operation is a direct operation, wherein the instructions further causes the processor to:
   responsive to reaching the binding point in the given call flow segment, pause execution of the call flow segment; and
   call out to an external Web service endpoint to receive direction using bound operation.

19. The data processing system of claim 15, wherein the interaction operation is a prescribe operation, wherein the instructions further causes the processor to:
   responsive to receiving an invocation from a service oriented architecture integration platform, receive a set of descriptive rules for decision making within the call flow segment.

20. The data processing system of claim 15, wherein the interaction operation is an act operation, wherein the instructions further causes the processor to:
   responsive to receiving an invocation from a service oriented architecture integration platform, initiate execution of the given call flow segment.

* * * * *